United States Patent [19]
Arrington et al.

[11] Patent Number: 5,850,783
[45] Date of Patent: Dec. 22, 1998

[54] DRENCHING APPARATUS

[75] Inventors: Clint P. Arrington; D. Frank Kelsey, both of Lakeland, Fla.

[73] Assignee: FMC Corporation, Chicago, Ill.

[21] Appl. No.: 656,797

[22] Filed: May 31, 1996

[51] Int. Cl.⁶ .............................. A23B 7/00; A23B 7/16; A23L 1/31; A23L 3/36
[52] U.S. Cl. ................................. 99/483; 99/516; 99/534
[58] Field of Search ............................. 99/516, 534–536, 99/487, 483, 623; 15/3.14, 3.17, 3.2; 134/113; 210/754; 426/523, 506, 509, 511, 331

[56] References Cited

U.S. PATENT DOCUMENTS

| | | | |
|---|---|---|---|
| 3,879,188 | 4/1975 | Fritz et al. | 426/268 |
| 3,950,559 | 4/1976 | Kapoor et al. | 426/335 |
| 4,006,557 | 2/1977 | Sawyer | 210/754 |
| 4,379,055 | 4/1983 | Carlson et al. | 99/644 |
| 4,532,858 | 8/1985 | Hershfeld | 99/534 |
| 4,614,656 | 9/1986 | Liu | 426/321 |
| 4,961,373 | 10/1990 | Milone | 99/535 X |
| 4,990,351 | 2/1991 | Orman et al. | 426/333 |
| 5,007,335 | 4/1991 | Orman et al. | 99/487 |
| 5,148,738 | 9/1992 | Orman et al. | 99/516 |
| 5,170,698 | 12/1992 | Kirk | 99/516 X |
| 5,231,921 | 8/1993 | Kirk | 99/537 |
| 5,525,132 | 6/1996 | Shanmuganathan | 426/656 |

*Primary Examiner*—Timothy F. Simone
*Attorney, Agent, or Firm*—Allen, Dyer, Doppelt, Milbrath & Gilchrist, P.A.

[57] ABSTRACT

An improved drench apparatus for drenching fruit and vegetables with an aqueous chemical solution having a pit for holding a large volume of said solution, drench pump for drawing solution from the pit and discharging it into manifolds equipped with nozzles for drenching the fruit, a recovery system for returning excess solution to the pit; comprising a holding tank for holding a volume of said solution; a heater, including a heater pump, connected to said holding tank and arranged to maintain the temperature of the solution therein; a re-circulation pump connected to draw solution from said pit and direct it to said heater with a conduit connecting said holding tank to said pit. The volume of said holding tank being sufficient to assure portions of the solution are maintained at said temperature for a time to eradicate pathogens.

12 Claims, 1 Drawing Sheet

DRENCHING APPARATUS

This invention relates to drenching apparatus, generally, and more particularly to such apparatus which utilizes heat as the primary means of controlling fruit pathogens.

Drenching is the application of an aqueous solution of a chemical to control pathogens on fruit and vegetables, wherein the application is by spraying the solution onto the fruit and vegetables while such fruit and vegetables are (i) in containers positioned on a platform under, or stacked on a trailer, or the bed of a truck, parked under an intermittently operated spraying apparatus, or (ii) moved past continually operating spraying apparatus (a) in containers which are each supported and moved by a powered conveyors, (b) conveyed as separate and individual pieces by a powered roller conveyor or by a application of a conveying force, such as the introduction of additional fruit or vegetables or a powered overhead drag bar, while supported on a roller conveyor.

One major use of drenching is to control fungal infestation on fresh fruit, which commands a higher price for the grower than the same fruit does when used for juice. The percentage of any crop, such as citrus, for example, suitable for sale in the fresh market can be increased through the application of a fungicide. One typical practice for application of the fungicide to citrus fruit is to drive a truck or trailer conveying the citrus fruit into a building equipped with overhead manifolds having multiple nozzles. The truck bed or trailer, either of which is commonly referred to as a "truck," and the fruit carried in containers, either wooden boxes or plastic bins, stacked thereon, are then literally drenched with a fungicide solution discharged through the nozzles. The floor of the building is constructed to recover excess solution which drains off the truck by sloping it toward an open tank or pit set below the lowest point of the floor. The recovered solution, after addition of make-up water and fungicide concentrate to compensate for that carried off on the fruit, containers and truck, is pumped from the pit through the manifolds after the next truck is properly positioned in the building. Some of the citrus pathogens and bacteria tend to multiply in the open pit, which organisms would be distributed over the fruit along with the solution. In order to keep the populations of such organisms at acceptable levels, it has been necessary to add chlorine to the solution. Chlorine, a strong oxidizing chemical that must be carefully handled, causes the metal parts of the truck or trailer to corrode, and even tends to destroy wooden boxes by attacking the metal parts used in their construction, and when plywood is used, by attacking the adhesives adhering the plies.

The present invention provides a drenching apparatus which utilizes heat as the primary means of controlling fungal pathogens and bacteria, which eliminates or significantly reduces the need to utilize chlorine, thereby overcoming or reducing the problems associated with the use of this element, which is efficient in utilization of energy, which is capable of being retrofitted to existing drenching facilities and which is relatively simple to install, operate and maintain. These and other benefits of the present invention, and many of the attendant advantages thereof, will become more readily apparent from a perusal of the following detailed description and the accompanying drawing, which is a schematic representation of a drenching apparatus according to the present invention.

DESCRIPTION OF THE PREFERRED EMBODIMENT

Figure 1:
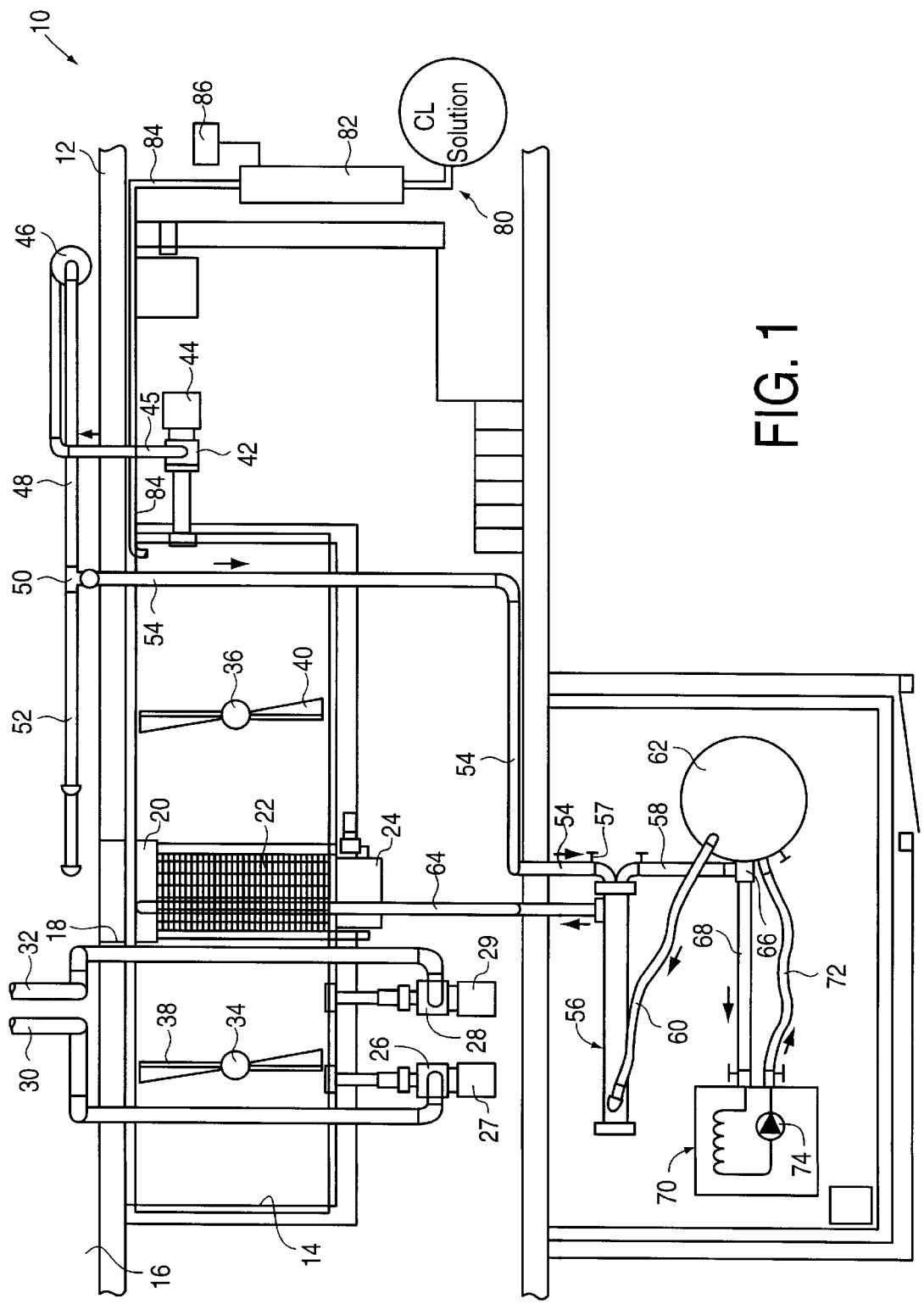
FIG. 1 is a diagrammatic view of the drenching apparatus.

Referring to the drawing, there is shown a drenching apparatus, indicated generally at 10, which includes a building, one wall of which is shown at 12, with an open pit 14 positioned adjacent the building. The floor, partially shown at 16, of the building is sloped toward the opening 18 so liquid deposited thereon will flow through the opening 18 onto a trough 20. The trough 20 is positioned below the opening and slightly above the lower end of an inclined open-mesh conveyor belt 22. The belt 22 is inclined upward about 10 degrees from the trough 20 and permits liquid to drain into the pit 14, but retains leaves, twigs and other large debris, which are deposited in a trash container 24 for later disposal. A pair of drench pumps 26 and 28, which are driven by electric motors 27 and 29 respectively, draws solution from the pit 14 and discharges it into manifolds 30 and 32 respectively. The manifolds are positioned within the building and provided with nozzles in a conventional manner to discharge solution to drench the fruit in containers with the solution from the pit 14.

A pair of electric motors 34 and 36 are rigidly suspended over the pit and, through speed reducers, which may be of the type sold by Grainger as their model number IL369, drive agitation paddles 38 and 40 respectively. The paddles stir the solution within the pit 14 so that solid materials, primarily sand, portions of leaves and twigs and other small debris, remain in suspension. The motors 34 and 36 are operated continuously during the picking season so that the solid materials do not settle to and accumulate on the bottom of the pit 14. Such solid materials would normally build up on the bottom of the pit, and the pit would have to be emptied of solution to allow the accumulated solid materials to be shoveled out by hand. The paddles keep the solid materials, which are washed from the fruit, containers and the track or trailer during each drench cycle and thus are continually being introduced to the solution in the pit, in suspension to permit removal by filtration as will be explained hereinafter.

A re-circulation pump 42, driven by electric motor 44, also draws solution from the pit 14 and discharges it through a filter 46 into conduit 48. The filter 46 removes sand and other small debris from the solution so that relatively clean solution is directed into the conduit 48. The conduit 48 is connected at tee 50 to sweep conduit 52 and to conduit 54 leading to heat exchanger 56. The heat exchanger may be of any type, but as shown, is a tube and shell type with the conduit 54 connected to the tube inlet and conduit 58 connected to the tube outlet. A conduit 60 communicates with one end of the shell of the heat exchanger 56 and with the top of a holding tank 62. A discharge conduit 64 communicates with the other end of the shell of the heat exchanger 56 and discharges into the pit 14. The conduit 58 is connected by tee 66 to a conduit 68 connected between the tank 62 and the inlet to a heater 70, while conduit 72 connects the outlet of the heater 70 to the holding tank 62. The heater 70 includes an internal heater plump 74 which circulates solution between the tank 62 and the heater 70 when energized by a conventional thermostatic control (not shown) which also turns on the burner of the heater 70 in order to maintain the temperature of the solution in the tank at 140° F.

When a truck is properly parked in the drench building, the motors 27 and 29 are energized driving the drench pumps 26 and 28 which draw fungicide solution from the pit 14 and discharge it through the manifolds 30 and 32.

Simultaneously, the motor 44 is energized driving the re-circulation pump 42. Solution is also drawn from the pit 14 by the pump 42, passed through the filter 46, directed through the conduit 54 to the heat exchanger 56 and into conduit 58.

The solution being drawn from the pit is relatively cold, being at or near ambient temperature, and will almost immediately drop the temperature of the solution in the holding tank 62 below 140° F. As a consequence the thermostatic control will turn on the burner in the heater 70 and energize the heater pump 74. The heater pump 74 has an output which is greater than the flow provided to the heat exchanger by the re-circulation pump 42, so the relatively cold solution will be drawn into the heater 70, rather than flowing directly into the holding tank 62, and the rate of flow out of the tank 62 through conduit 60 will equal the flow through the conduit 58 provided by the pump 42. The heated solution flowing from the tank 62 through conduit 60 into the shell of the heat exchanger 56 will heat the solution entering the tubes of the heat exchanger and the solution flowing toward the heater 70 will be heated above ambient. The temperature differential that the heater 70 is required to overcome in raising the temperature of the solution to 140° F. is reduced, resulting in efficient utilization of energy and a low cost of operation. In addition, the temperature of the solution being returned to the pit 14 is lowered so that the temperature of the solution in the pit 14 will remain near ambient. This is important since exposure to temperatures above 110° F. can be harmful to some fruits, and because vapor and mist resulting from the drenching operation increases as the temperature of the pit solution increases. Holding vapor and mist at a low level is desirable in order to minimize the environmental and safety impact of the fungicide carried in the solution.

In a typical installation, the re-circulation pump 42 is sized to deliver about 200 gpm to the filter 46, but only 25 gpm is permitted to flow through the conduit 54 toward the heat exchanger 56, which flow rate can be determined by adjustment of a valve, such as valve 57 in the conduit 54. The remaining portion of the output from the re-circulation pump 42, i.e. 175 gpm, is directed to the sweep conduit 52 and is utilized to wash the solid materials which fall to the floor 16 onto the conveyor 22, which allows solution and small solid materials to fall into the pit 14. The motor 44 driving the re-circulation pump 42 is energized simultaneously with the motors 27 and 29 driving the drench pumps 26 and 28 at the start of a drench cycle. The motors 27 and 29 are timed to operate for about 3 minutes, but the motor 44 is timed to operate for about 20 minutes. Since the entire output of the re-circulation pump 42 passes through the filter 46, the volume of solution filtered during each complete cycle is 4000 gallons. Since a typical pit 14 holds about 1500 gallons, it can be seen the solution in the pit 14 is maintained relatively clean since almost three times the volume of the pit passes through the filter 46 during each cycle and small solid materials are not permitted to settle because of the continuously operating paddles 40 and 38. The tank 62 has a capacity of about 120 gallons, and since it is receiving solution from the pit 14 at the rate of 25 gpm, the time an incremental portion of the solution in the tank will remain at the temperature of 140° F. is more than 4 minutes. Since it has been discovered that citrus pathogens and heat-sensitive bacteria are killed after being subjected to 130° F. for about one minute, solution returning to the pit 14 from the tank 62 will not carry any live pathogens or heat sensitive bacteria. Even though holding incremental amounts of the solution in the tank at 130° F. for one minute will kill all such organisms, it is preferable to hold incremental amounts at a higher temperature, e.g. 140° F., for a longer period of time, e.g. two minutes, to obviate even the possibility of heat resistant strains of such organisms being developed. By operating the re-circulation pump 42 for about 20 minutes, the total volume of solution cleansed of such organisms is about 500 gallons. In addition, 55 to 60 gallons of solution are carried away during each cycle on the truck, containers and fruit and is replaced by introducing freshwater into the pit 14, along with an appropriate amount of fungicide. Thus, over one third of the capacity of a typical pit 14 is cleansed of potentially harmful organisms during each drench cycle, and the entire contents of the pit will be cleansed of pathogens and bacteria during each hour of successive drench cycles. The populations of such organisms are thus maintained at an acceptable low level as long as the drenching apparatus is in continual operation.

Operation of the heater 70 and the re-circulation pump 42 during the night, or during days when picking of the fruit has to be suspended due to inclement weather, for example, may be economically unattractive. The cost of operating such equipment can be avoided by adding chlorine to the solution in the pit 14 to control the population of the undesirable organisms. The amount of chlorine and timing of its introduction can be predetermined, e.g. at a predetermined time of day and/or after the elapse of predetermined amount of time, and thus automated.

The chlorine injection system for providing such flexibility is schematically indicated at 80, and includes a conventional injector mechanism 82, connected to a replenishable tank or replaceable drum of chlorine solution, for introducing an adjustable, but predetermined amount of chlorine into the solution in the pit 14 through line 84. A programmable timer 86 is connected to the injector mechanism 82, and may be set to actuate the mechanism to provide the introduction of chlorine as necessary to permit one or more of the modes of operation set forth above.

What is claimed is:

1. An improved drench apparatus drenching fruit and vegetables with an aqueous chemical solution having a pit for holding a large volume of said solution, drench pump means for drawing solution from the pit and discharging it into manifolds equipped with nozzles for drenching the fruit, recovery means for returning excess solution to the pit; the improvement comprising:

a holding tank for holding a volume of said solution;

a heater, including a heater pump, connected to said holding tank and arranged to maintain the temperature of the solution therein at a given minimum;

a re-circulation pump connected to draw solution from said pit and direct it to said heater;

conduit means connecting said holding tank to said pit; and the volume of said holding tank being sufficient to assure incremental portions of solution in said tank are maintained at said given minimum temperature for a time sufficient to assure the eradication of pathogens before being discharged into said pit.

2. The invention according to claim 1, wherein said given minimum temperature is 130° F. and said time is at least one minute.

3. An improved drench apparatus for drenching fruit with an aqueous chemical solution having a pit for holding a large volume of said solution, drench pump means for drawing solution from the pit and discharging it into manifolds equipped with nozzles for drenching the fruit, recovery means for returning excess solution to the pit; the improvement comprising:

a holding tank for holding a volume of said solution;

a heater, including a heater pump, connected to said holding tank and arranged to maintain the temperature of the solution therein at a minimum of 130° F.;

a re-circulation pump connected to draw solution from said pit and direct it to said heater;

conduit means connecting said holding tank to said pit; and the volume of said holding tank being sufficient to assure incremental portions of solution in said tank are maintained at a minimum of 130° F. for at least one minute before being discharged into said pit.

4. The invention according to claim 3, and further comprising a heat exchanger arranged to transfer heat from the solution being discharged from the holding tank toward the pit to the solution directed toward the heater by said re-circulation pump, whereby the temperature of the solution in the pit remains near ambient and the heat input to the solution entering the heater is reduced.

5. The invention according to claim 3 and further comprising:

constantly-driven agitation paddle means for keeping in suspension solid materials washed into the pit with the excess solution; and filter means interposed on the discharge side of said re-circulation pump.

6. The invention according to claim 5 and further comprising sweep conduits connected downstream of said filter means for directing the majority of the output from said re-circulation pump onto said recovery means.

7. The invention according to claim 3 and further comprising means for introducing chlorine to the solution in the pit only at predetermined times, whereby the corrosive action of the chlorine is reduced or eliminated.

8. An improved drench apparatus for applying fungicide solution to fruit comprising:

a holding tank for retaining a given volume of said solution;

a heater for maintaining the temperature of the solution in said tank at a given minimum;

re-circulation pump means for supplying solution to said heater at a given rate; and said given volume being sufficiently large so that at said given rate incremental portions of the solution in said tank will be retained for a time sufficient to eradicate pathogens.

9. The invention according to claim 8, and further comprising: a heat exchanger for increasing the temperature of the solution directed toward said heater by transferring heat from the solution being discharged from said tank and for maintaining the temperature of the solution in said pit near ambient.

10. The invention according to claim 8 wherein said drenching apparatus includes a pit for holding recovered solution and solid materials, and further comprising:

continuously driven agitator means for maintaining the solid materials suspended in the solution in the pit, and filter means interposed between said re-circulation pump and said heater for removing solid materials from the solution pumped by said re-circulation pump.

11. The invention according to claim 8 and further comprising means for introducing a predetermined amount of chlorine to the solution in said pit only at predetermined times.

12. The invention according to claim 8 wherein said minimum temperature is 130° F. and said time is at least one minute.

* * * * *